(12) United States Patent
Weinfield et al.

(10) Patent No.: US 11,910,280 B2
(45) Date of Patent: Feb. 20, 2024

(54) METHODS AND SYSTEMS FOR TRANSMITTING BASIC SAFETY MESSAGES

(71) Applicants: DENSO International America, Inc., Southfield, MI (US); DENSO CORPORATION, Aichi (JP)

(72) Inventors: Aaron D. Weinfield, Encinitas, CA (US); Mark A. Wilson, Cardiff, CA (US)

(73) Assignees: DENSO International America, Inc., Southfield, MI (US); DENSO CORPORATION, Kariya (JP)

( * ) Notice: Subject to any disclaimer, the term of this patent is extended or adjusted under 35 U.S.C. 154(b) by 511 days.

(21) Appl. No.: 16/819,419

(22) Filed: Mar. 16, 2020

(65) Prior Publication Data

US 2021/0289326 A1  Sep. 16, 2021

(51) Int. Cl.
| | | |
|---|---|---|
| *H04W 4/40* | (2018.01) | |
| *G01S 19/24* | (2010.01) | |
| *H04W 4/029* | (2018.01) | |
| *G06F 16/29* | (2019.01) | |
| *G01C 21/30* | (2006.01) | |

(52) U.S. Cl.
CPC .............. *H04W 4/40* (2018.02); *G01C 21/30* (2013.01); *G01S 19/243* (2013.01); *G06F 16/29* (2019.01); *H04W 4/029* (2018.02)

(58) Field of Classification Search
CPC .... G01C 21/30; G01C 21/3407; G08G 1/093; G08G 1/096716; G08G 1/09675; G08G 1/096791; G08G 1/167; G08G 1/166; G06F 16/29; G01S 19/243; G01S 5/0072; G01S 19/14; G01S 19/40; G01S 19/393; H04W 4/40; H04W 4/029
See application file for complete search history.

(56) References Cited

U.S. PATENT DOCUMENTS

| | | | |
|---|---|---|---|
| 4,837,700 A | 6/1989 | Ando et al. | |
| 5,283,575 A | 2/1994 | Kao et al. | |
| 9,360,335 B1* | 6/2016 | Powelson | G01C 21/3415 |
| 2010/0149030 A1* | 6/2010 | Verma | G08B 25/10 |
| | | | 342/357.64 |
| 2011/0184640 A1* | 7/2011 | Coleman | G01C 21/3492 |
| | | | 701/533 |
| 2017/0365166 A1* | 12/2017 | Lu | G08G 1/0112 |
| 2018/0105182 A1* | 4/2018 | Kim | G01S 13/931 |
| 2019/0265049 A1 | 8/2019 | Loomis | |
| 2020/0045517 A1* | 2/2020 | Park | H04W 4/12 |
| 2022/0099843 A1* | 3/2022 | Kbayer | G01S 19/243 |

* cited by examiner

*Primary Examiner* — Geepy Pe
*Assistant Examiner* — Paulo Roberto Gonzalez Leite
(74) *Attorney, Agent, or Firm* — Harness, Dickey & Pierce, P.L.C.

(57) ABSTRACT

A method for broadcasting a basic safety message (BSM) packet from a host vehicle includes storing at least one path history entry of the host vehicle. The method includes determining whether a global navigation satellite system (GNSS) position fix is available. The method includes performing a corrective action on the at least one path history entry in response to the GNSS position fix not being available. The method includes, in response to the GNSS position fix being available, calculating a path history entry to be stored among the at least one path history entry based on the GNSS position fix. The method includes generating and broadcasting the BSM packet based on the at least one path history entry.

20 Claims, 7 Drawing Sheets

METHODS AND SYSTEMS FOR TRANSMITTING BASIC SAFETY MESSAGES

FIELD

The present disclosure relates to systems and methods for performing corrective actions on path history entries of a basic safety message.

BACKGROUND

The statements in this section merely provide background information related to the present disclosure and may not constitute prior art.

Vehicle-to-vehicle, vehicle-to-infrastructure, vehicle-to-network, vehicle-to-pedestrian, vehicle-to-device, and vehicle-to-grid systems (collectively referred to as V2X systems) rely on a host vehicle receiving messages from one or more surrounding vehicles, roadside devices, and/or other external devices. The host vehicle may receive the messages using, for example, a dedicated short-range communication (DSRC) system, a cellular-V2X (C-V2X) communication system, and/or the like.

Vehicles of a V2X systems may also utilize Global Network Satellite System (GNSS) receivers (e.g., Global Positioning System (GPS) receivers) for determining position of the vehicle and are configured to periodically exchange basic safety messages (BSMs) that include the current vehicle position (e.g., latitude, longitude, elevation, among others), speed, heading, brake status, turn signal status, and/or other vehicle information. In one example, the BSM may be configured in accordance with a standard protocol, such as Society of Automotive Engineers (SAE) J2735 and are used or transmitted in accordance with SAE J2945/1.

The BSMs may also include path history (PH) information of the vehicle which includes a plurality of data points that collectively indicate a previous or current trajectory of the vehicle. The PH information may be utilized for predicting roadway geometry and for executing various local safety systems, such as a forward collision warning system, a blind spot warning system, a lane change warning system, and/or the like. However, vehicles may travel to locations that cause the GNSS receivers to lose a position fix. Accordingly, the PH information generated by the vehicle may inaccurately represent the previous trajectory of the vehicle, thereby inhibiting the vehicle from accurately predicting the roadway geometry and executing various local safety systems.

SUMMARY

This section provides a general summary of the disclosure and is not a comprehensive disclosure of its full scope or all of its features.

The present disclosure provides a method for broadcasting a basic safety message (BSM) packet from a host vehicle includes storing at least one path history entry of the host vehicle. The method includes determining whether a global navigation satellite system (GNSS) position fix is available. The method includes performing a corrective action on the at least one path history entry in response to the GNSS position fix not being available. The method includes, in response to the GNSS position fix being available, calculating a path history entry to be stored among the at least one path history entry based on the GNSS position fix. The method includes generating and broadcasting the BSM packet based on the at least one path history entry.

In some forms, the method further includes storing the at least one path history entry in a database of the host vehicle.

In some forms, performing the corrective action on the at least one path history entry further includes deleting the at least one path history entry from the database.

In some forms, performing the corrective action on the at least one path history entry further includes initiating a timer and, in response to initiating the timer, determining a value of the timer when a subsequent GNSS signal comprises information indicating the GNSS position fix is available. Performing the corrective action on the at least one path history entry further includes determining whether the value of the timer is greater than a threshold value. Performing the corrective action on the at least one path history entry further includes, in response to determining that the value of the timer is greater than the threshold value, deleting the at least one path history entry from the database.

In some forms, performing the corrective action on the at least one path history entry further includes obtaining a first timestamp of a first GNSS signal and, in response to obtaining the first timestamp, obtaining a second timestamp of a subsequent GNSS signal when the subsequent GNSS signal comprises information indicating the GNSS position fix is available. Performing the corrective action on the at least one path history entry further includes determining a distance based on the first timestamp and the second timestamp. Performing the corrective action on the at least one path history entry further includes determining whether the distance is greater than a threshold distance. Performing the corrective action on the at least one path history entry further includes, in response to determining that the distance is greater than the threshold distance, deleting the at least one path history entry from the database.

In some forms, the method further includes determining the distance based on speed information generated by at least one sensor of the host vehicle.

In some forms, performing the corrective action on the at least one path history entry further includes determining whether a subsequent GNSS signal comprises information indicating the GNSS position is available and, in response to determining the subsequent GNSS signal comprises information indicating that the GNSS position fix is available, generating a second path history entry as part of the at least one path history entry. Performing the corrective action on the at least one path history entry further includes modifying the at least one path history of the database to remove each path history entry of the at least one path history entry obtained prior to the second path history entry.

In some forms, the method further includes determining whether the second path history entry is different from the at least one path history entry obtained prior to the second path history entry. The method further includes, in response to determining the second path history entry is different from the at least one path history entry obtained prior to the second path history entry, modifying the at least one path history of the database to remove each path history entry obtained prior to the second path history entry.

In some forms, the method further includes generating connection information indicating a degree of connection associated with a received GNSS signal and generating the BSM packet based on the connection information.

In some forms, the connection information indicates at least one of a partial GNSS position fix and an unavailable GNSS position fix.

The present disclosure provides a system for broadcasting a basic safety message (BSM) packet from a host vehicle includes a processor and a nontransitory computer-readable medium comprising instructions that are executable by the processor. The instructions include: storing at least one path history entry of the host vehicle. The instructions include determining whether a global navigation satellite system (GNSS) position fix is available. The instructions include performing a corrective action on the at least one path history entry in response to the GNSS position fix not being available. The instructions include, in response to the GNSS position fix being available, calculating a path history entry to be stored among the at least one path history entry based on the GNSS position fix. The instructions include generating and broadcasting the BSM packet based on the at least one path history entry.

In some forms, the system further comprises a database configured to store the at least one path history entry.

In some forms, the instructions for performing the corrective action on the at least one path history entry further include deleting the at least one path history entry from the database.

In some forms, the instructions for performing the corrective action on the at least one path history entry further include initiating a timer and, in response to initiating the timer, determining a value of the timer when a subsequent GNSS signal comprises information indicating the GNSS position fix is available. The instructions for performing the corrective action on the at least one path history entry further include determining whether the value of the timer is greater than a threshold value. The instructions for performing the corrective action on the at least one path history entry further include, in response to determining that the value of the timer is greater than the threshold value, deleting the at least one path history entry from the database.

In some forms, the instructions for performing the corrective action on the at least one path history entry further include obtaining a first timestamp of a first GNSS signal and, in response to obtaining the first timestamp, obtaining a second timestamp of a subsequent GNSS signal when the subsequent GNSS signal comprises information indicating the GNSS position fix is available. The instructions for performing the corrective action on the at least one path history entry further include determining a distance based on the first timestamp and the second timestamp. The instructions for performing the corrective action on the at least one path history entry further include determining whether the distance is greater than a threshold distance. The instructions for performing the corrective action on the at least one path history entry further include, in response to determining that the distance is greater than the threshold distance, deleting the at least one path history entry from the database.

In some forms, the instructions further include determining the distance based on speed information generated by at least one sensor of the host vehicle.

In some forms, the instructions for performing the corrective action on the at least one path history entry further include determining whether a subsequent GNSS signal comprises information indicating the GNSS position is available and, in response to determining the subsequent GNSS signal comprises information indicating that the GNSS position fix is available, generating a second path history entry as part of the at least one path history entry. The instructions for performing the corrective action on the at least one path history entry further include modifying the at least one path history of the database to remove each path history entry obtained prior to the second path history entry.

In some forms, the instructions for performing the corrective action on the at least one path history entry further include determining whether the second path history entry is different from the at least one path history entry obtained prior to the second path history entry. The instructions for performing the corrective action on the at least one path history entry further include, in response to determining the second path history entry is different from the at least one path history entry obtained prior to the second path history entry, modifying the at least one path history of the database to remove each path history entry obtained prior to the second path history entry.

In some forms, the instructions further include generating connection information indicating a degree of connection associated with a received GNSS signal. The instructions further include generating the BSM packet based on the connection information.

In some forms, the connection information indicates at least one of a partial GNSS position fix and an unavailable GNSS position fix.

Further areas of applicability will become apparent from the description provided herein. It should be understood that the description and specific examples are intended for purposes of illustration only and are not intended to limit the scope of the present disclosure.

DRAWINGS

In order that the disclosure may be well understood, there will now be described various forms thereof, given by way of example, reference being made to the accompanying drawings, in which.

Figure 1:
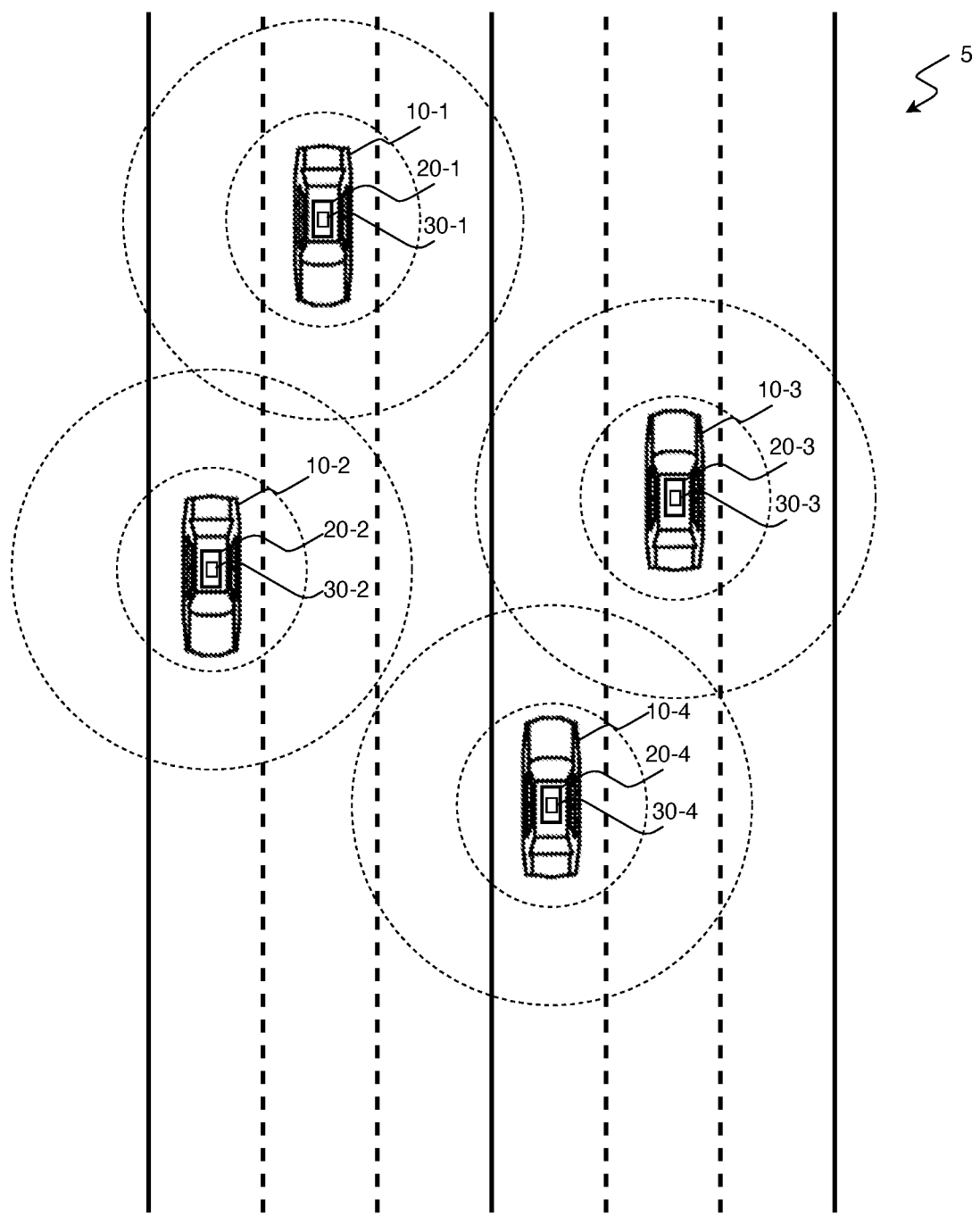
FIG. 1 illustrates a plurality of vehicles of a roadway system in accordance with the teachings of the present disclosure.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

The present disclosure relates to systems and methods for performing corrective actions on PH information generated by a host vehicle when a GNSS position fix is unavailable. Performing the corrective actions on the PH information inhibits the host vehicle from transmitting BSMs with inaccurate PH information to nearby vehicles. Accordingly, vehicles that are near the host vehicle do not use the inaccurate PH information while performing various local safety functions (e.g., roadway geometry prediction functions, local safety system functions, among others). These issues with PH information when a GNSS position fix is unavailable, among other issues with PH information, are addressed by the present disclosure.

Referring to FIG. 1, a roadway system 5 including a plurality of vehicles is shown. The roadway system 5 includes vehicles 10-1, 10-2, 10-3, 10-4 (collectively referred to as vehicles 10) that are respectively equipped with V2X systems 20-1, 20-2, 20-3, 20-4 (collectively referred to as V2X systems 20). The components of the V2X system 20 may be located at one or multiple locations on the roof of the vehicle 10. In some forms, some of the components of the V2X system 20 may be located in the interior of the vehicle 10. While the V2X system 20 is illustrated as being located on the roof of the vehicle 10, the V2X system 20, and any or all of its components, may be disposed at any location on the vehicle 10 (e.g., the front, rear, and sides of the vehicle 10).

The V2X system 20 may be configured to transmit and receive signals representing, for example, early warnings of accidents and driving hazards to and from other V2X systems 20 provided at remote vehicles, infrastructure, and/or pedestrians, among others. Accordingly, local safety systems communicatively coupled to the V2X system 20 may be configured to predict future accidents and driving hazards based on communication with remote vehicles, infrastructure, pedestrians, among others, that are equipped with V2X systems 20 by calculating the current and future positions of the vehicle 10.

The V2X system 20 may also be configured to improve a fuel efficiency of the vehicle 10 by transmitting and receiving information corresponding to traffic signals. For example, the V2X system 20 may be configured to communicate a timing of a traffic signal to an operator of the vehicle 10, thereby allowing the operator to optimize fuel efficiency and perform timesaving driving habits. For instance, the V2X system 20 may be configured to communicate with the traffic signal and alert the operator as to how much time the operator has until the light will change from a red light to a green light, a green light to a yellow light, or a yellow light to a red light. As another example, the V2X system 20 may instruct the operator to operate the vehicle at a certain speed in order to avoid being stopped by a red light on a traffic route.

The V2X system 20 may be a DSRC system that communicates with other vehicles or infrastructure equipped with a DSRC system by using a 75 megahertz (MHz) band around a 5.9 gigahertz (GHz) signal. The V2X system 20 may also be a C-V2X system that communicates with other vehicles or infrastructure equipped with a C-V2X system by using a 75 MHz band around a 5.9 GHz signal. It should be understood that other communication systems, center frequencies, and/or bandwidths may be implemented within the V2X system 20 in other forms.

The V2X system 20 is configured to broadcast and receive BSMs. In some forms, the V2X system 20 broadcasts BSMs at a specified rate. As an example, the V2X system 20 may broadcast BSMs at a frequency of 10 Hz. It should be understood that the V2X system 20 may broadcast the BSMs at other rates and is not limited to the rate described herein.

The BSM may include one or more parts. As an example, a first part of the BSM may indicate a vehicle position (e.g., latitude, longitude, elevation, among others), a vehicle speed, a vehicle heading, a brake status, a turn signal status, and other vehicle information. Furthermore, a second part of the BSM may include event flags, path prediction information, and PH information. It should be understood that the BSM may have any number of parts associated with various information and is not limited to the parts described herein.

The PH information may include a plurality of data points indicating a previous trajectory of the vehicle. The PH information may be broadcasted when information received from a GNSS receiver 30 of the vehicle 10 indicates a GNSS position fix is available, as described below in further detail. As used herein, the phrase "GNSS position fix" refers to information indicating that the position of the vehicle 10 may accurately be determined within a predefined tolerance. As an example, the information received from a respective GNSS receiver 30-1, 30-2, 30-3, 30-4 (collectively referred to as GNSS receivers 30) of the vehicle 10 may indicate the GNSS position fix is available when it includes at least one of a GNSS almanac and a GNSS ephemeris. In some forms, the PH information may be utilized for predicting roadway geometry and for executing various local safety systems, such as a forward collision warning system, blind spot warning system, a lane change warning system, and/or the like. In some forms, the PH information is calculated in accordance with the standard set forth in at least one of SAE J2945/1 and SAE J3161/1.

Figure 2:
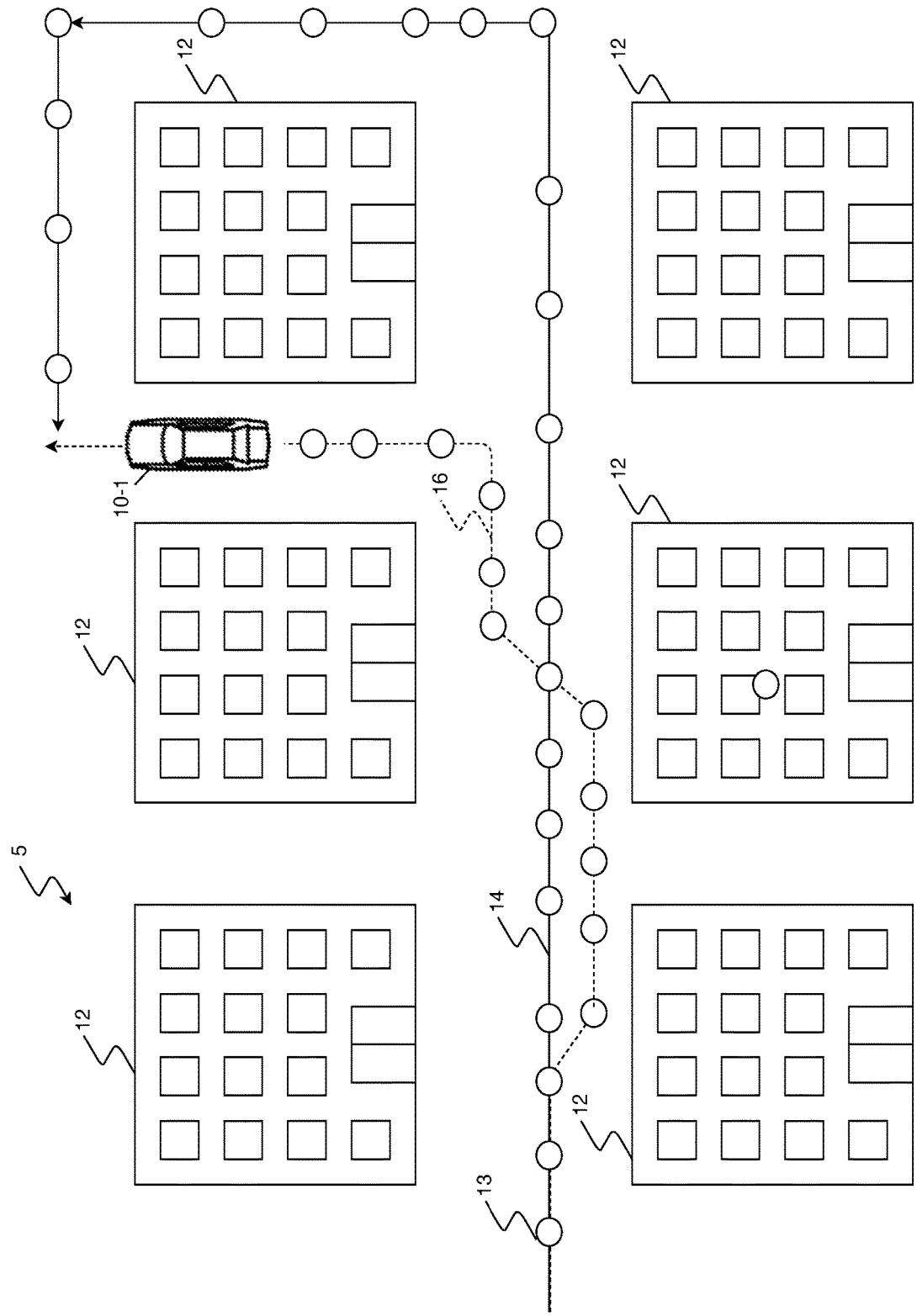
FIG. 2 illustrates PH information generated by a vehicle in accordance with the teachings of the present disclosure.

Referring to FIG. 2, the vehicle 10-1 may travel in an area of the roadway system 5 in which the information received from the GNSS receiver 30 of the vehicle 10 indicates that a GNSS position fix is unavailable. As an example, the unavailability of the GNSS position fix may result from GNSS signal interference caused by buildings (e.g., buildings 12), walls, natural geological formations (e.g., mountains), components of the vehicle 10 (e.g., heat-absorbing glass of the vehicle 10, luggage positioned on a roof of the vehicle 10, among others), an error or a lack of a GNSS almanac and/or a GNSS ephemeris, among others. Based on the unavailability of the GNSS position fix, the PH information generated by the vehicle 10 may indicate, as illustrated by PH points 13, that the vehicle 10 traveled along predicted path 14 as opposed to actual path 16.

As described below in further detail, the vehicle 10-1 is configured to perform a corrective action routine when the information received from the GNSS receiver 30 of the vehicle 10-1 indicates that the GNSS position fix is unavailable. Accordingly, the vehicle 10-1 may broadcast BSMs with accurate PH information, thereby enabling other vehicles 10-2, 10-3, 10-4 to accurately predict the roadway geometry and execute various local safety systems when the information received from the GNSS receiver 30 of the vehicle 10-1 indicates an unavailability of a GNSS position fix.

Figure 3:
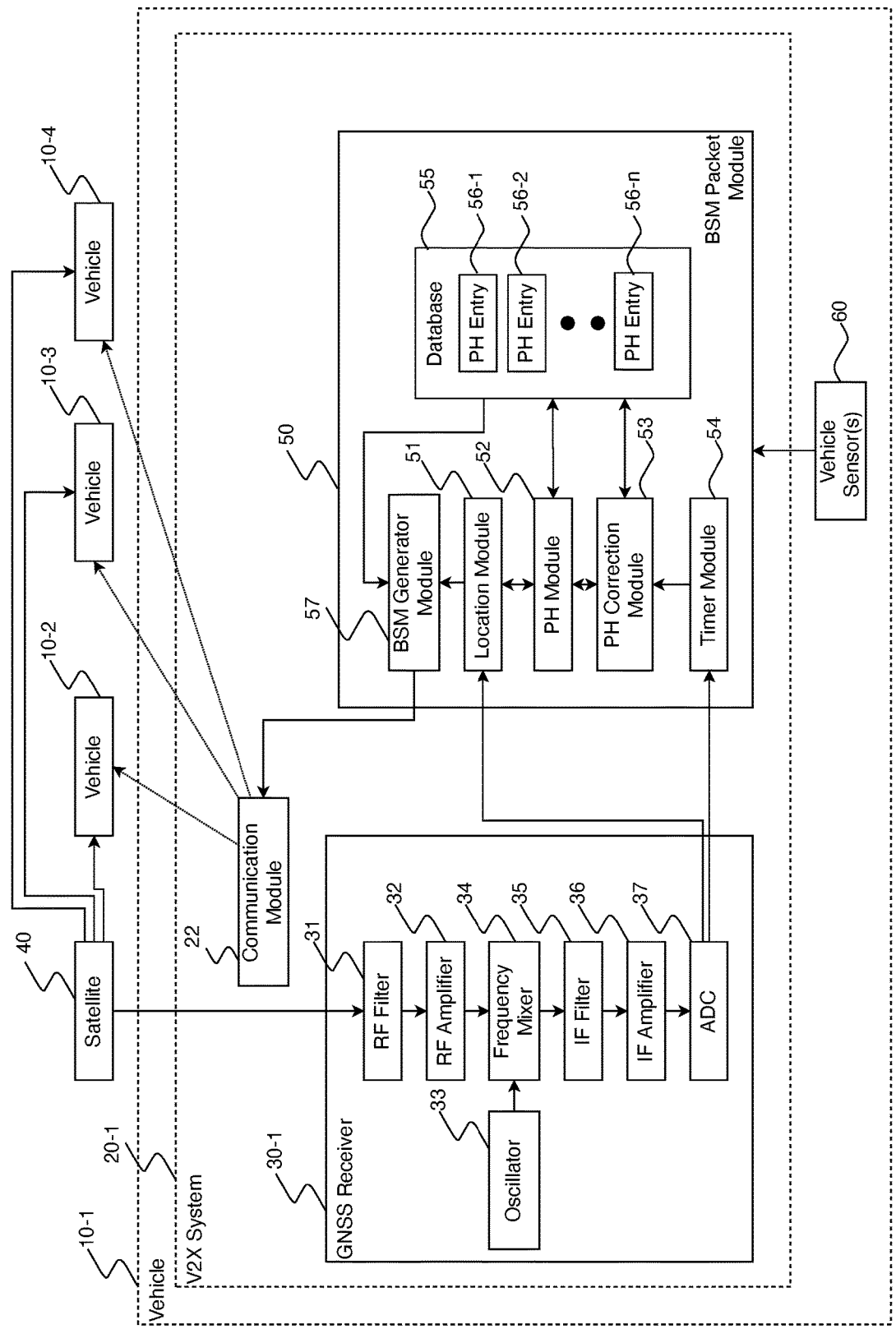
FIG. 3 is a functional block diagram of a vehicle in accordance with the teachings of the present disclosure.

Referring to FIG. 3, a block diagram of the vehicles 10 is shown. As described above, the vehicle 10-1 includes the V2X system 20-1, which includes a communication module 22, the GNSS receiver 30-1, a BSM packet module 50, and one or more vehicle sensors 60. In some forms, the one or more vehicle sensors 60 may be removed from the vehicle 10-1. While the communication module 22, the GNSS receiver 30-1, the BSM packet module 50, and the one or more vehicle sensors 60 are shown as part of vehicle 10-1, it should be understood that these components may also be included within vehicles 10-2, 10-3, 10-4.

The BSM packet module 50 includes a location module 51, a PH module 52, a PH correction module 53, a timer module 54, a database 55, and a BSM generator module 57. In order to execute the functionality described herein, the BSM packet module 50 may include one or more processor circuits that execute machine-readable instructions stored in a nontransitory computer-readable medium, such as a read-only memory (ROM) circuit and/or a random-access memory (RAM) circuit.

In one form, the communication module 22 is configured to generate and broadcast V2X signals and receive V2X signal from external device. As an example, the vehicle 10-1 may use V2X signals received via the communication module 22 to perform various path/trajectory planning routines and/or the like. Accordingly, in order to perform the functionality described herein, the communication module 22 includes one or more transceivers, radio circuits, amplifiers, and/or modulation circuits among other electronic components. Along with exchanging data with external devices, the communication module 22 may also be communicably coupled to a vehicle communication network (not shown) such as controller area network (CAN) or local interconnect network (LIN), for transmitting data to other modules within the vehicle 10-1. The communication module 22 may further include one or more processor circuits that execute machine-readable instructions stored in a nontransitory computer-readable medium, such as a ROM circuit and/or a RAM circuit for performing the functional operations described herein such as processing messages received from other vehicles and forwarding data from the messages to one or more other modules within the vehicle 10-1.

In one form, the GNSS receiver module 30-1 includes a radio frequency (RF) filter 31, an RF amplifier 32, a local oscillator 33, a frequency mixer 34, an intermediate frequency (IF) filter 35, an IF amplifier 36, and an analog-to-digital converter (ADC) 37. The radio frequency (RF) filter 31 and the RF amplifier 32 are configured to suppress image frequencies and to prevent the V2X system 20 from becoming saturated. The local oscillator 33 is configured to provide a mixing frequency to the frequency mixer 34 in order to change the received frequency into a new, intermediate frequency. The IF filter 35 and the IF amplifier 36 are configured to amplify the signal received from the frequency mixer 34 and limit the intermediate frequencies to a certain bandwidth. Subsequently, the ADC 37 converts the filtered intermediate frequency to a digital signal that is referenced as a GNSS signal and is provided to the BSM packet module 50 to, for example, calculate location information associated with the vehicle 10, as described below in further detail.

The location module 51 of the BSM packet module 50 is configured to receive the digital signal from the GNSS receiver 30-1 and calculate the location information associated with the vehicle 10-1. In some forms, the location module 51 determines whether the location information indicates that a GNSS position fix is available. As an example, the location module 51 may determine that a GNSS position fix is available in response to the GNSS signal having at least one of the GNSS almanac and/or the GNSS ephemeris. As another example, the location module 51 may determine that a GNSS position fix is unavailable in response to the GNSS signal not having at least one of the GNSS almanac and/or the GNSS ephemeris. In some forms, the location module 51 calculates the location information associated with the vehicle 10 in response to determining that the GNSS position fix is available.

In one form, the location module 51 is configured to determine a distance traveled by the vehicle 10-1. For example, in one form, the location module 51 obtains one or more timestamps of the GNSS signal received by the GNSS receiver 30-1 and determines a distance traveled by the vehicle 10 based on the multiple timestamps and the location information. In another example, the location module 51 determines the distance traveled based on the time stamps and the vehicle speed obtained from the one or more vehicle sensors 60, as described below in further detail.

The PH module 52 is configured to generate PH entries 56-1, 56-2, 56-n (collectively referred to as PH entries 56) based on the location information as determined by the location module 51. In some forms, the PH entries 56 are generated in accordance with the standard set forth in at least one of SAE J2945/1 and SAE J3161/1. When the PH module 52 generates the PH entries 56, the PH module 52 is configured to store the PH entries 56 in a database 55 (e.g., a repository, a cache, and/or the like). The PH module 52 may selectively store and/or delete the PH entries 56 from the database 55. As an example, the PH module 52 may be configured to limit the amount of PH entries 56 stored in the database 55 (e.g., ten PH entries 56) by continuously deleting the oldest PH entry once a new PH entry above the predefined threshold is generated (e.g., deleting the first PH entry when the eleventh PH entry is generated, deleting the second PH entry when the twelfth PH entry is generated, and so on).

The timer module 54 is configured to initiate a timer that incrementally increases its value proportionally to an amount of elapsed time in response to the BSM packet module 50 receiving the signal from the GNSS receiver 30-1. If the value of the timer exceeds a threshold value, the PH correction module 53 is configured to perform various corrective actions on at least one PH entry 56 of the database 55, as described below in further detail.

The PH correction module 53 is configured to perform various corrective actions on the at least one PH entry 56 of the database 55 based on a determination of whether the GNSS position fix is available. As an example, if the location module 51 determines that the GNSS position fix is unavailable, the PH correction module 53 may perform a corrective action by generating connection data that is appended to the PH entry (e.g., PH entry 56-1), where the connection data indicates a degree of the GNSS position fix (e.g., appending a first bit value when a GNSS fix is unavailable, appending a second bit value when the GNSS receiver 30 executes a dead reckoning process to approximate the location of the vehicle 10-1, appending a third bit value when a two-dimensional GNSS fix is available, appending a fourth bit value when a three-dimensional GNSS fix is available, among others).

As another example, if the location module 51 determines that the GNSS position fix is unavailable, the PH correction module 53 may delete at least one PH entry of the plurality of PH entries 56 from the database 55 (e.g., the PH correction module 53 may delete each of the previous ten PH entries 56), as described below in further detail with reference to FIG. 4. As yet another example, if the location module 51 determines that the GNSS position fix is unavailable, the PH correction module 53 may delete at least one PH entry of the plurality of PH entries 56 from the database 55 if a subsequent GNSS indicating that a GNSS position fix is available is not received within a threshold period of time or distance, as described below in further detail with reference to FIGS. 5-6. As yet another example, if the location module 51 determines that the GNSS position fix is unavailable, the PH correction module 53 may delete each previous PH entry of the plurality of PH entries 56 from the database 55 if a subsequent GNSS signal indicating that a GNSS position fix is available is obtained and causes the PH module 52 to generate a new PH entry, as described below in further detail with reference to FIG. 7.

The BSM generator module 57 is configured to generate the BSM, which may include the at least one PH entry 56 from the database 55, when the GNSS position fix is available. As an example, when the PH entries are not deleted from the database 55 by the PH correction module 53, the BSM generator module 57 generates a BSM that includes each of the plurality of PH entries 56 of the database 55 (e.g., ten PH entries 56). As another example, when the GNSS position fix is obtained after not being available, the BSM packet module 50 generates a BSM that does not include any previous PH entries 56 as a result of the corrective routine performed by the PH correction module 53, as described below in further detail.

Along with PH entries, the BSM packet includes vehicle information such as a vehicle speed, a vehicle heading, a brake status, a turn signal status, and other vehicle information. Specifically, in one form, the BSM generator module 57 acquires vehicle information from one or more vehicle sensors 60 and/or other modules within the vehicle 10-1 and generates the BSM packet using the vehicle information. Once the BSM packet is generated, the communication module 22 is configured to broadcast a V2X signal with the BSM packet embedded therein.

Figure 4:
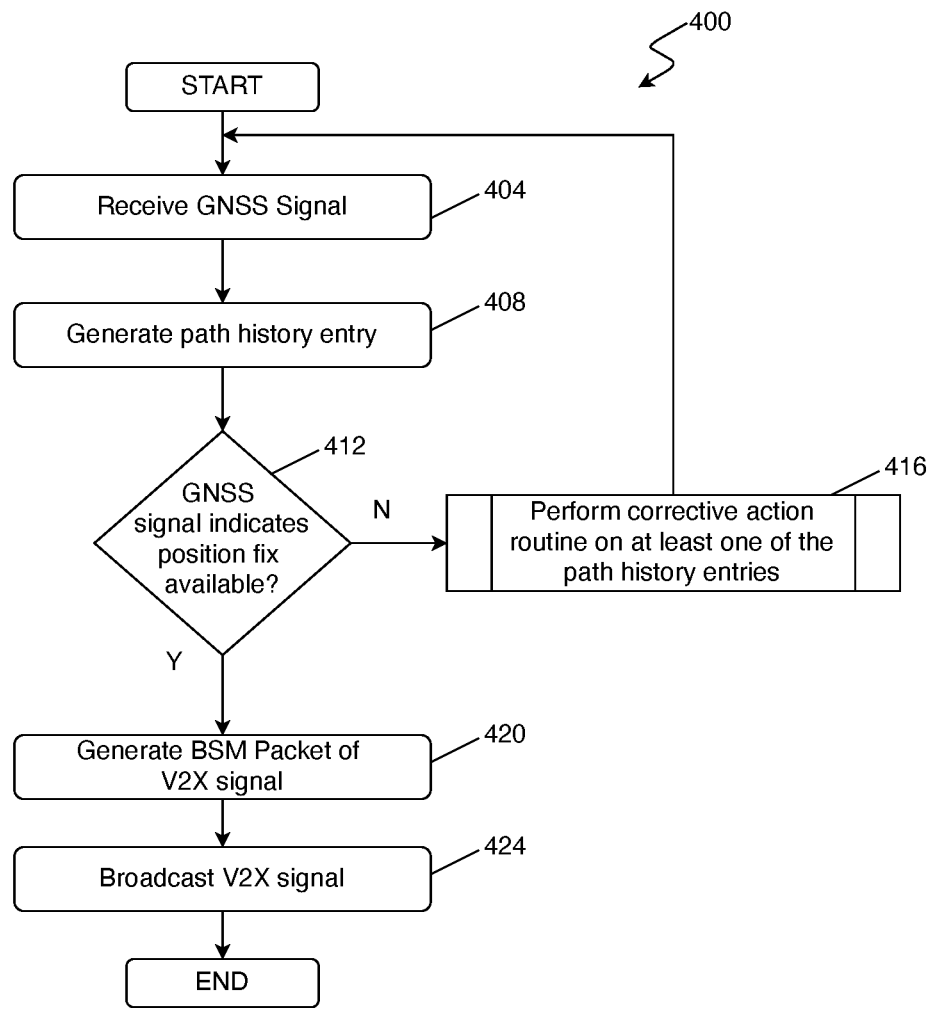
FIG. 4 is a flowchart of an example control routine in accordance with the teachings of the present disclosure.

With reference to FIG. 4, an example control routine 400 performed by the V2X system 20 is illustrated. At 404, the V2X system 20 receives a GNSS signal and generates the PH entry based on the location and time information of the received GNSS signal, at 408. At 412, the V2X system 20 determines whether the GNSS signal indicates a position fix is available (e.g., a lack of a GNSS almanac and/or a GNSS ephemeris may indicate an unavailable GNSS position fix). If so, the V2X system 20 proceeds to generate the BSM packet and broadcasts the BSM packet via the V2X signal at 420 and 424, respectively. Conversely, if the GNSS signal does not include a position fix, the V2X system 20 performs a corrective action at 416 and then returns to 404. An example corrective action routine includes deleting each of the at least one PH entry 56 of the database 55. Additional corrective action routines are described below in further detail with reference to FIGS. 5-7.

Figure 5:
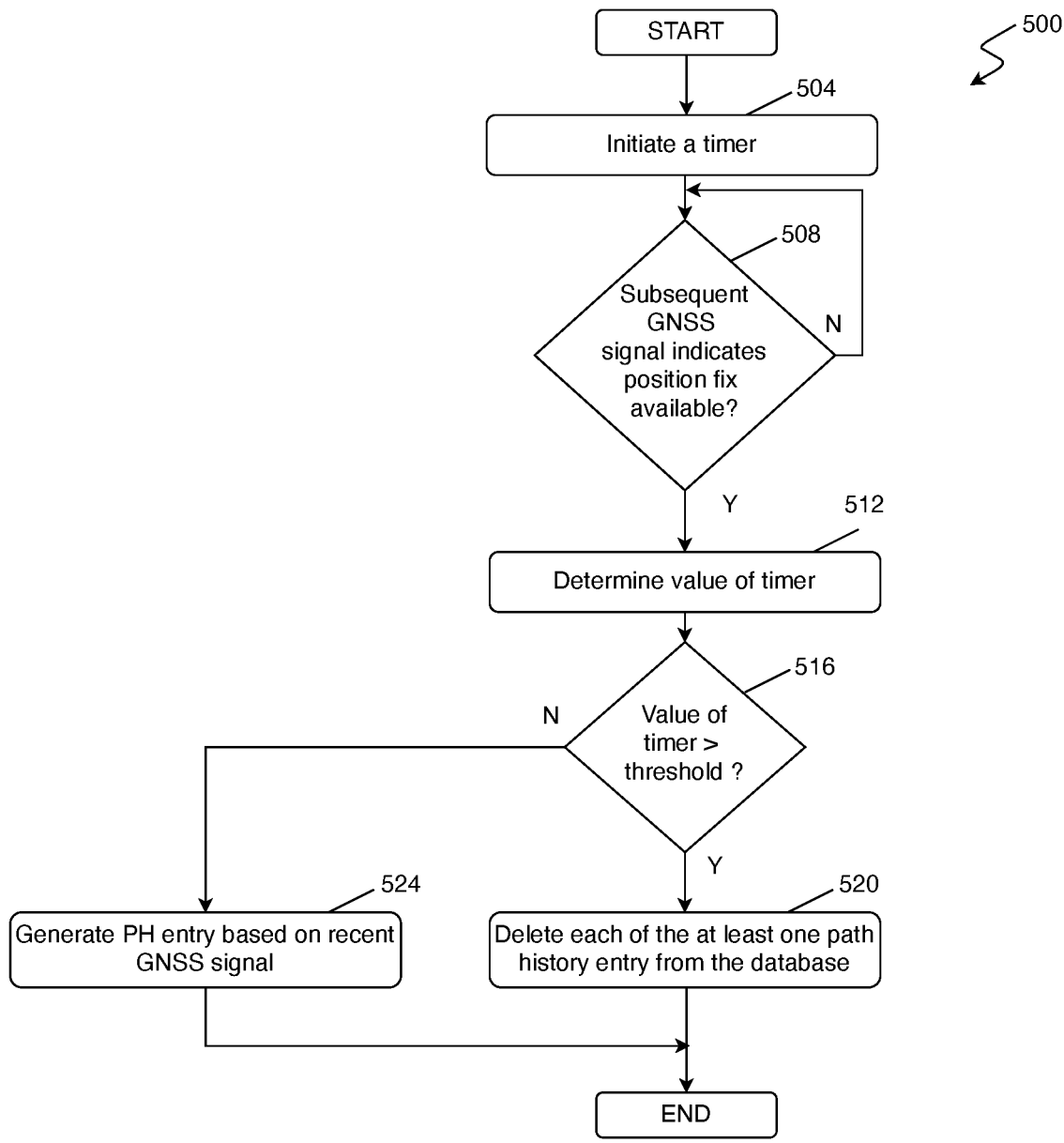
FIG. 5 is a flowchart of an example control routine in accordance with the teachings of the present disclosure.

With reference to FIG. 5, an example control routine 500 for performing the corrective action described at step 416 in FIG. 4 is shown. In this corrective action, the V2X system 20 deletes the PH entries in the database when too much time has passed since the last GNSS position fix. At 504, the V2X system 20 initiates the timer and, at 508 determines whether a subsequent GNSS signal received by the GNSS receiver 30 indicates that the GNSS position fix is available. The V2X system 20 remains at 508 until the GNSS position fix is available. Once available, the V2X system 20 determines the value of the timer, at 512, and determines whether the value of the timer is greater than a threshold value, at 516. If so, the V2X system 20, at 520 deletes each of the at least one PH entry of the database 55. Conversely, if the value of the timer is less than or equal to the threshold value at 516, the V2X system 20 generates the PH entry based on the recent GNSS signal at 524.

Figure 6:
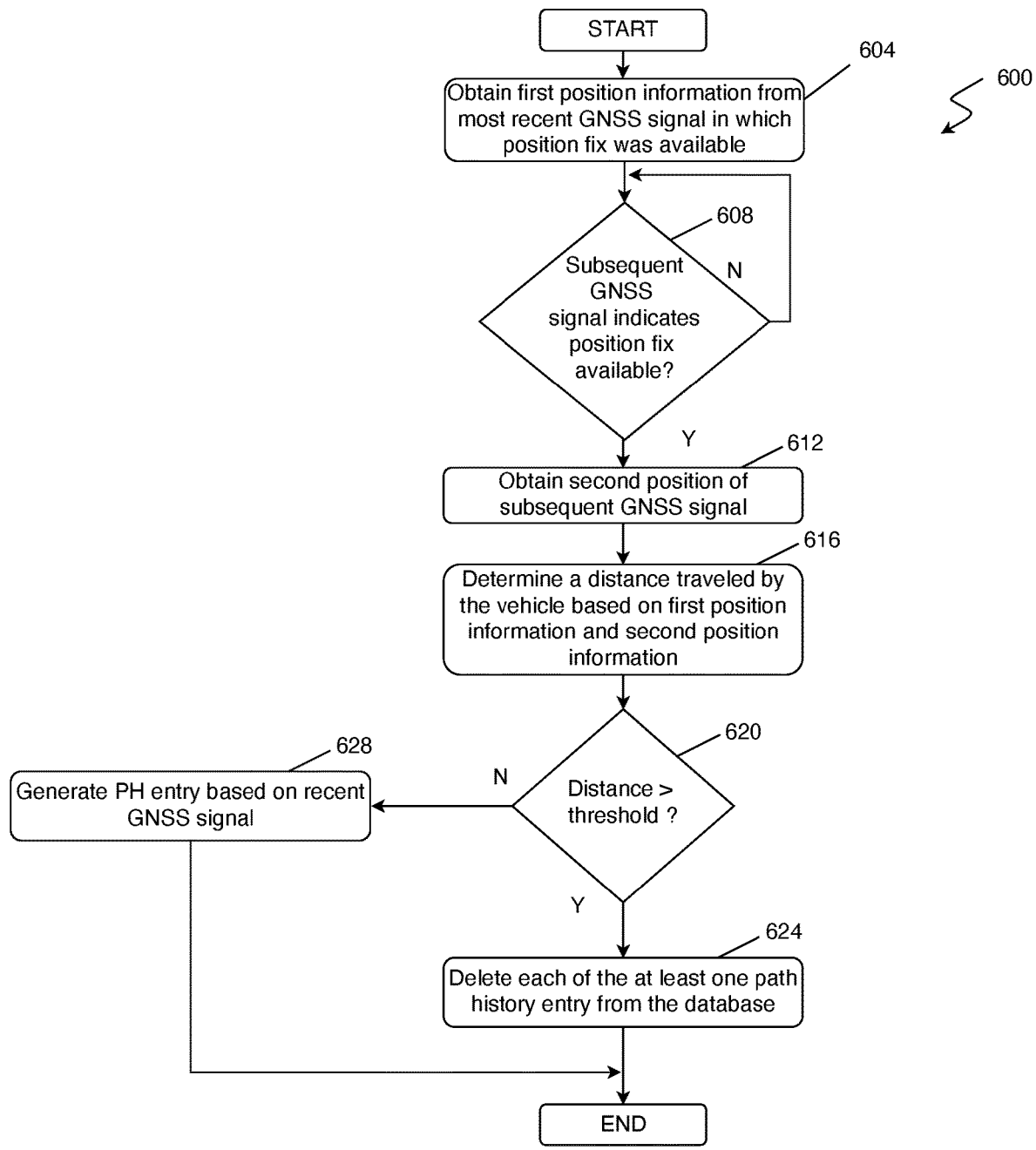
FIG. 6 is a flowchart of an example control routine in accordance with the teachings of the present disclosure.

With reference to FIG. 6, an example control routine 600 for performing the corrective action described at step 416 in FIG. 4 is shown. In this corrective action, the V2X system 20 deletes the PH entries in the database when the vehicle 10-1 has traveled too far since the last GNSS position fix. At 604, the V2X system 20 obtains first position information from the most recent GNSS signal in which the position fix was available. At 608, the V2X system 20 determines whether a subsequent GNSS signal indicates that a GNSS position fix is available. If so, the control routine 600 proceeds to 612; otherwise, the control routine 600 remains at 608 until the subsequent GNSS signal indicates that the GNSS position fix is available. At 612, the V2X system 20 obtains second position information of the subsequent GNSS signal. At 616, the V2X system 20 determines a distance traveled by the vehicle 10 based on the first position information and the second position information. At 620, the V2X system 20 determines whether the distance traveled by the vehicle 10 is greater than a threshold value. If so, the control routine 600 proceeds to 624, where the V2X system 20 deletes each of the at least one PH entry 56 of the database 55. Conversely, if the distance is less than or equal to the threshold value at 620, the V2X system 20 generates the PH entry based on the recent GNSS signal at 628.

Figure 7:
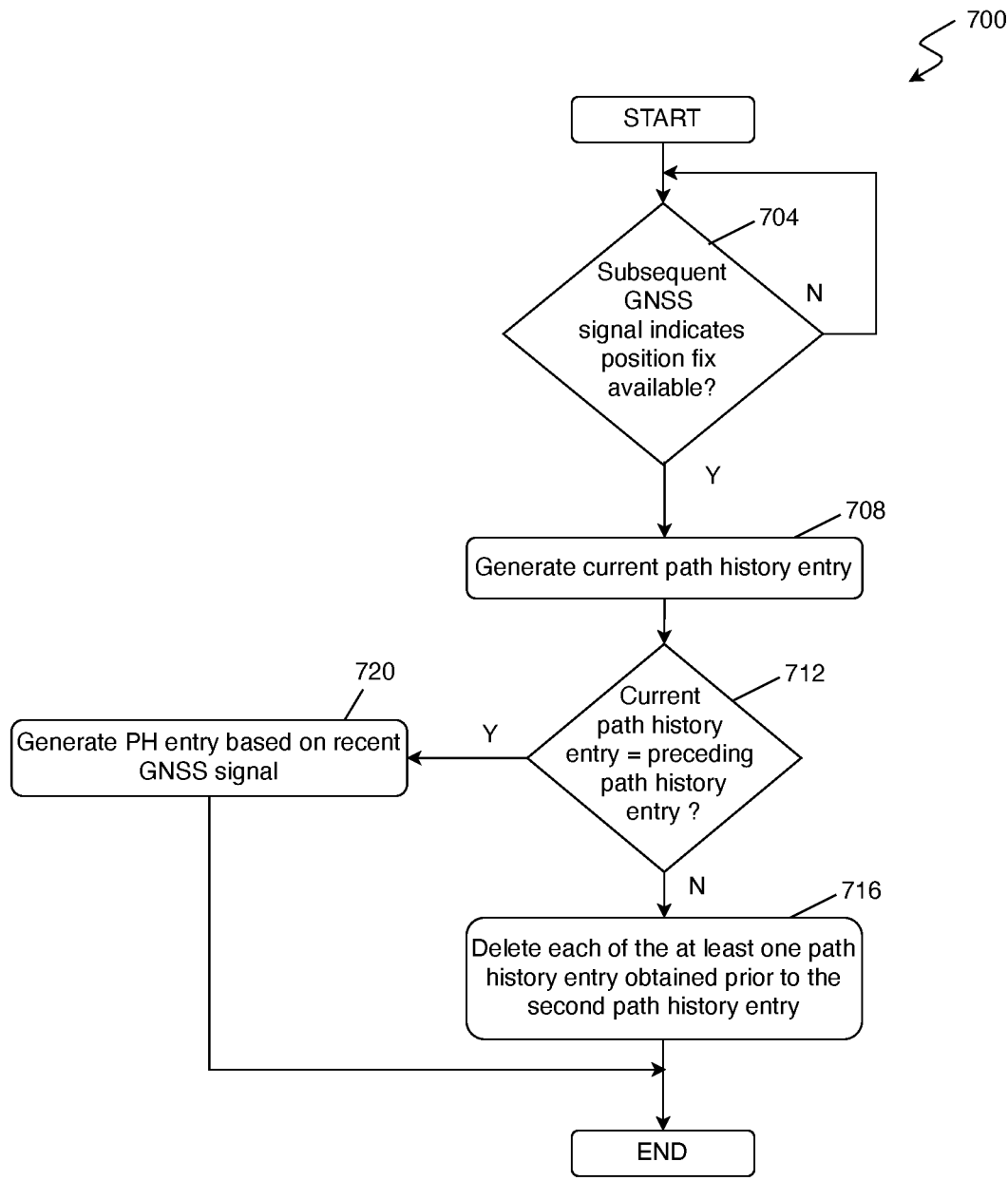
FIG. 7 is a flowchart of an example control routine in accordance with the teachings of the present disclosure.

With reference to FIG. 7, an example control routine 700 for performing the corrective action described at step 416 in FIG. 4. In this corrective action, the V2X system 20 deletes the PH entries in the database if a preceding PH entry is different than a current PH entry. At 704, the V2X system 20 determines whether a subsequent GNSS signal received by the GNSS receiver indicates that a GNSS position fix is available. If so, the control routine 700 proceeds to 708; otherwise, the control routine 700 remains at 704 until the subsequent GNSS signal indicates that the GNSS position fix is available. At 708, the V2X system 20 generates a current PH entry based on the subsequent GNSS signal. At 712, the V2X system 20 determines whether the current PH entry corresponds to at least one of the preceding PH entries 56 (e.g., the PH correction module 53 determines whether the current PH entry indicates the same location information as one of the preceding PH entries 56). If so, the V2X system 20 generates the PH entry based on the recent GNSS signal at 720; otherwise, the control routine 700 proceeds to 716, where the V2X system 20 deletes each of the at least one PH entry 56 of the database 55 obtained prior to the current PH entry.

It should be readily understood that the routines 500, 600, 700 are just example implementations of the corrective action routine described at step 416 of FIG. 4, and other control routines may be implemented.

Unless otherwise expressly indicated herein, all numerical values indicating mechanical/thermal properties, compositional percentages, dimensions and/or tolerances, or other characteristics are to be understood as modified by the word "about" or "approximately" in describing the scope of the present disclosure. This modification is desired for various reasons including industrial practice, manufacturing technology, and testing capability.

As used herein, the phrase at least one of A, B, and C should be construed to mean a logical (A OR B OR C), using a non-exclusive logical OR, and should not be construed to mean "at least one of A, at least one of B, and at least one of C."

The description of the disclosure is merely exemplary in nature and, thus, variations that do not depart from the substance of the disclosure are intended to be within the scope of the disclosure. Such variations are not to be regarded as a departure from the spirit and scope of the disclosure.

In the figures, the direction of an arrow, as indicated by the arrowhead, generally demonstrates the flow of information (such as data or instructions) that is of interest to the illustration. For example, when element A and element B exchange a variety of information, but information transmitted from element A to element B is relevant to the illustration, the arrow may point from element A to element B. This unidirectional arrow does not imply that no other information is transmitted from element B to element A. Further, for information sent from element A to element B, element B may send requests for, or receipt acknowledgements of, the information to element A.

In this application, the term "module" and/or "controller" may refer to, be part of, or include: an Application Specific Integrated Circuit (ASIC); a digital, analog, or mixed analog/digital discrete circuit; a digital, analog, or mixed analog/digital integrated circuit; a combinational logic circuit; a field programmable gate array (FPGA); a processor circuit (shared, dedicated, or group) that executes code; a memory circuit (shared, dedicated, or group) that stores code executed by the processor circuit; other suitable hardware components that provide the described functionality; or a combination of some or all of the above, such as in a system-on-chip.

The term memory is a subset of the term computer-readable medium. The term computer-readable medium, as used herein, does not encompass transitory electrical or electromagnetic signals propagating through a medium (such as on a carrier wave); the term computer-readable medium may therefore be considered tangible and nontransitory. Non-limiting examples of a nontransitory, tangible computer-readable medium are nonvolatile memory circuits (such as a flash memory circuit, an erasable programmable read-only memory circuit, or a mask read-only circuit), volatile memory circuits (such as a static random access memory circuit or a dynamic random access memory circuit), magnetic storage media (such as an analog or digital magnetic tape or a hard disk drive), and optical storage media (such as a CD, a DVD, or a Blu-ray Disc).

The apparatuses and methods described in this application may be partially or fully implemented by a special purpose computer created by configuring a general-purpose computer to execute one or more particular functions embodied in computer programs. The functional blocks, flowchart components, and other elements described above serve as software specifications, which can be translated into the computer programs by the routine work of a skilled technician or programmer.

What is claimed is:

1. A method for broadcasting a basic safety message (BSM) packet from a host vehicle, the method comprising:
   storing at least one path history entry of the host vehicle;
   determining whether a global navigation satellite system (GNSS) position fix is available;
   performing a corrective action on a previously obtained path history entry from among the at least one path history entry of a first portion of the BSM packet in response to the GNSS position fix not being available;
   in response to the GNSS position fix being available, calculating a path history entry to be stored among the at least one path history entry of the first portion of the BSM packet based on the GNSS position fix; and
   generating and broadcasting the BSM packet based on the at least one path history entry.

2. The method of claim 1 further comprising storing the at least one path history entry in a database of the host vehicle.

3. The method of claim 2, wherein performing the corrective action on the previously obtained path history entry further comprises deleting the previously obtained path history entry from the database.

4. The method of claim 2, wherein performing the corrective action on the previously obtained path history entry further comprises:
   initiating a timer;
   in response to initiating the timer, determining a value of the timer when a subsequent GNSS signal comprises information indicating the GNSS position fix is available;
   determining whether the value of the timer is greater than a threshold value; and
   in response to determining that the value of the timer is greater than the threshold value, deleting the previously obtained path history entry from the database.

5. The method of claim 2, wherein performing the corrective action on the previously obtained path history entry further comprises:
   obtaining a first timestamp of a first GNSS signal;
   in response to obtaining the first timestamp, obtaining a second timestamp of a subsequent GNSS signal when the subsequent GNSS signal comprises information indicating the GNSS position fix is available;
   determining a distance based on the first timestamp and the second timestamp;
   determining whether the distance is greater than a threshold distance; and
   in response to determining that the distance is greater than the threshold distance, deleting the previously obtained path history entry from the database.

6. The method of claim 5 further comprising determining the distance based on speed information generated by at least one sensor of the host vehicle.

7. The method of claim 2, wherein performing the corrective action on the previously obtained path history entry further comprises:
   determining whether a subsequent GNSS signal comprises information indicating the GNSS position is available;
   in response to determining the subsequent GNSS signal comprises information indicating that the GNSS position fix is available, generating a second path history entry as part of the at least one path history entry; and
   modifying the at least one path history of the database to remove each path history entry of the at least one path history entry obtained prior to the second path history entry.

8. The method of claim 7 further comprising:
   determining whether the second path history entry is different from the at least one path history entry obtained prior to the second path history entry; and
   in response to determining the second path history entry is different from the at least one path history entry obtained prior to the second path history entry, modifying the at least one path history of the database to remove each path history entry obtained prior to the second path history entry.

9. The method of claim 1 further comprising:
   generating connection information indicating a degree of connection associated with a received GNSS signal; and
   generating the BSM packet based on the connection information.

10. The method of claim 9, wherein the connection information indicates at least one of a partial GNSS position fix and an unavailable GNSS position fix.

11. A system for broadcasting a basic safety message (BSM) packet from a host vehicle, the system comprising:
    a processor; and
    a non-transitory computer-readable medium comprising instructions that are executable by the processor, wherein the instructions comprise:

storing at least one path history entry of the host vehicle;

determining whether a global navigation satellite system (GNSS) position fix is available;

performing a corrective action on a previously obtained path history entry from among the at least one path history entry of a first portion of the BSM packet in response to the GNSS position fix not being available;

in response to the GNSS position fix being available, calculating a path history entry to be stored among the at least one path history entry of the first portion of the BSM packet based on the GNSS position fix; and generating and broadcasting the BSM packet based on the at least one path history entry.

12. The system of claim 11 further comprising a database configured to store the at least one path history entry.

13. The system of claim 12, wherein the instructions for performing the corrective action on the previously obtained path history entry further comprise deleting the previously obtained path history entry from the database.

14. The system of claim 12, wherein the instructions for performing the corrective action on the previously obtained path history entry further comprise:

initiating a timer;

in response to initiating the timer, determining a value of the timer when a subsequent GNSS signal comprises information indicating the GNSS position fix is available;

determining whether the value of the timer is greater than a threshold value; and in response to determining that the value of the timer is greater than the threshold value, deleting the previously obtained path history entry from the database.

15. The system of claim 12, wherein the instructions for performing the corrective action on the previously obtained path history entry further comprise:

obtaining a first timestamp of a first GNSS signal;

in response to obtaining the first timestamp, obtaining a second timestamp of a subsequent GNSS signal when the subsequent GNSS signal comprises information indicating the GNSS position fix is available;

determining a distance based on the first timestamp and the second timestamp;

determining whether the distance is greater than a threshold distance; and in response to determining that the distance is greater than the threshold distance, deleting the previously obtained path history entry from the database.

16. The system of claim 15, wherein the instructions further comprise determining the distance based on speed information generated by at least one sensor of the host vehicle.

17. The system of claim 12, wherein the instructions for performing the corrective action on the previously obtained path history entry further comprise:

determining whether a subsequent GNSS signal comprises information indicating the GNSS position is available;

in response to determining the subsequent GNSS signal comprises information indicating that the GNSS position fix is available, generating a second path history entry as part of the at least one path history entry; and modifying the at least one path history of the database to remove each path history entry obtained prior to the second path history entry.

18. The system of claim 17, wherein the instructions for performing the corrective action on the at least one path history entry further comprise:

determining whether the second path history entry is different from the at least one path history entry obtained prior to the second path history entry; and in response to determining the second path history entry is different from the at least one path history entry obtained prior to the second path history entry, modifying the at least one path history of the database to remove each path history entry obtained prior to the second path history entry.

19. The system of claim 11, wherein the instructions further comprise:

generating connection information indicating a degree of connection associated with a received GNSS signal; and generating the BSM packet based on the connection information.

20. The system of claim 19, wherein the connection information indicates at least one of a partial GNSS position fix and an unavailable GNSS position fix.

* * * * *